United States Patent [19]

Fisher et al.

[11] 4,364,433

[45] Dec. 21, 1982

[54] REMOTE CONNECTION APPARATUS

[75] Inventors: Edmund A. Fisher, Houston; John S. Platou, Crosby, both of Tex.

[73] Assignee: Cameron Iron Works, Inc., Houston, Tex.

[21] Appl. No.: 197,114

[22] Filed: Oct. 15, 1980

[51] Int. Cl.³ .................... E21B 43/01; F16L 19/06
[52] U.S. Cl. ................................. 166/339; 166/344; 166/347
[58] Field of Search .............. 166/339, 344, 347; 277/2

[56] References Cited

U.S. PATENT DOCUMENTS

| | | | |
|---|---|---|---|
| 3,481,396 | 12/1969 | Williams et al. | 166/339 |
| 3,701,549 | 10/1972 | Koomey et al. | 285/131 X |
| 3,710,859 | 1/1973 | Hanes et al. | 166/339 |
| 3,732,923 | 5/1973 | Fowler | 166/339 X |
| 3,820,600 | 6/1974 | Baugh | 166/344 X |
| 3,840,071 | 10/1974 | Baugh et al. | 166/338 |

*Primary Examiner*—James A. Leppink
*Assistant Examiner*—Thuy M. Bui
*Attorney, Agent, or Firm*—Vinson & Elkins

[57] ABSTRACT

A remote connection apparatus having a base plate with a test sealing ring attached thereto, a plurality of segments movably supported for both radial movement and vertical movement and cam means for moving the segments radially into sealing engagement with the test sealing ring or with a receptacle ring, the segments including passages to which flexible lines are connected and radial passages extending from the sealing surface of the segments whereby when the segments seal against the receptacle ring the passages in the segments are in communication with the passages in the receptacle ring.

7 Claims, 7 Drawing Figures

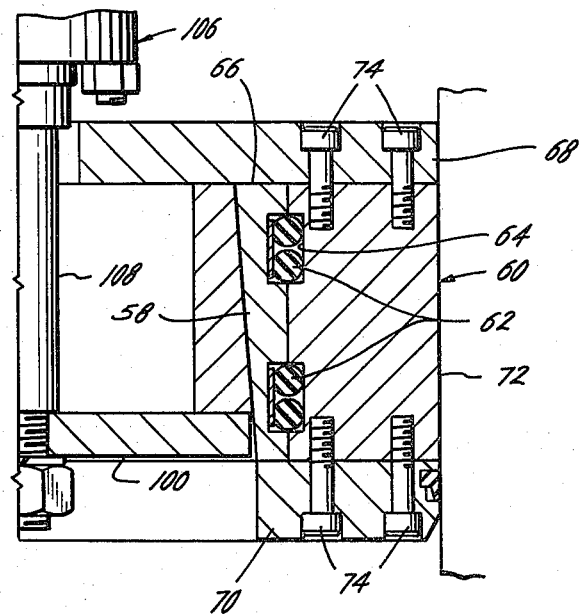
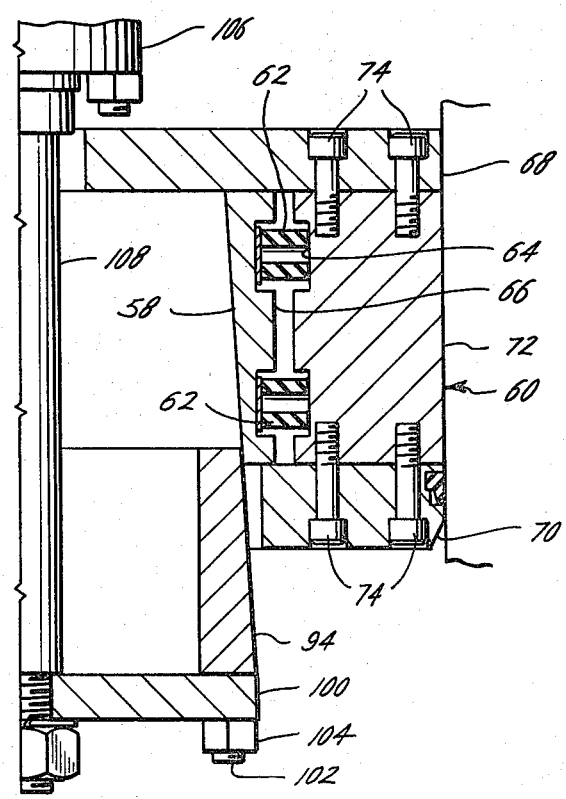

REMOTE CONNECTION APPARATUS

BACKGROUND

In the drilling of underwater wells, the subsea wellheads of such wells are provided with a blowout preventer stack. The operation of the blowout preventers is generally controlled by hydraulic lines leading from the surface to the stack. It is preferred that such lines be lowered and remotely connected in place on a wellhead member after the stack has been lowered and connected in its place on the subsea wellhead.

Prior remote connectors for hydraulic lines have been provided which stab in and lock in place in a subsea receptacle, such as shown in the P. C. Koomey et al. U.S. Pat. No. 3,701,549, the H. A. Baugh U.S. Pat. No. 3,820,600, the H. A. Baugh et al. U.S. Pat. No. 3,840,071, and the C. A. Schulte U.S. Pat. No. 4,219,223.

When such connectors have been landed on the wellhead member and connected into their receptacle they are tested. In the event of a leak being indicated in one of the hydraulic lines, the connector must be retrieved and checked to determine where the leak is in the system.

SUMMARY

The present invention relates to an improved remote connection apparatus having specific application to the connection of hydraulic lines to a subsea wellhead member. The apparatus includes a plurality of segments with radial passages on their sealing surfaces, lines connect to the segments in communication with the radial passages, a suitable segment support structure allows radial movement of the segments, cam means to move the segments to sealed position, means biasing the segments away from sealed position, a test sealing ring having a sealing surface against which the segments may seal in one position and means for moving the segments, support structure, and cam means to one position in which the segments may seal against the test seal ring sealing surface and to a second position in which the segments may seal against the sealing surface of the wellhead receptacle ring.

An object of the present invention is to provide an improved remote connection apparatus which may be moved to sealed position and tested at the surface and also upon landing in its desired remote location.

Another object is to provide an improved remote connection apparatus which may be isolated and tested for leaks against a test seal ring after landing on a subsea wellhead member when a leak is detected in the whole system to determine whether or not the leak occurs in the lines extending to the seal on the wellhead member.

A further object is to provide an improved remote connection apparatus which seals on an internal cylindrical surface of the wellhead member and does not slide over the surface in moving to sealing position.

BRIEF DESCRIPTION OF THE DRAWINGS

These and other objects and advantages of the present invention are hereinafter set forth and explained with reference to the drawings wherein:

FIG. 6 is a partial sectional view taken along line 6—6 in FIG. 2 of a segment which has been actuated to sealing position by the cam and showing the biasing means in compressed condition.

FIG. 7 is another partial section view similar to FIG. 6 showing the retraction of the cam means and the expansion of the biasing means to cause the segments to return to their inward or non-sealing position.

DESCRIPTION OF THE PREFERRED EMBODIMENT

Figure 1:
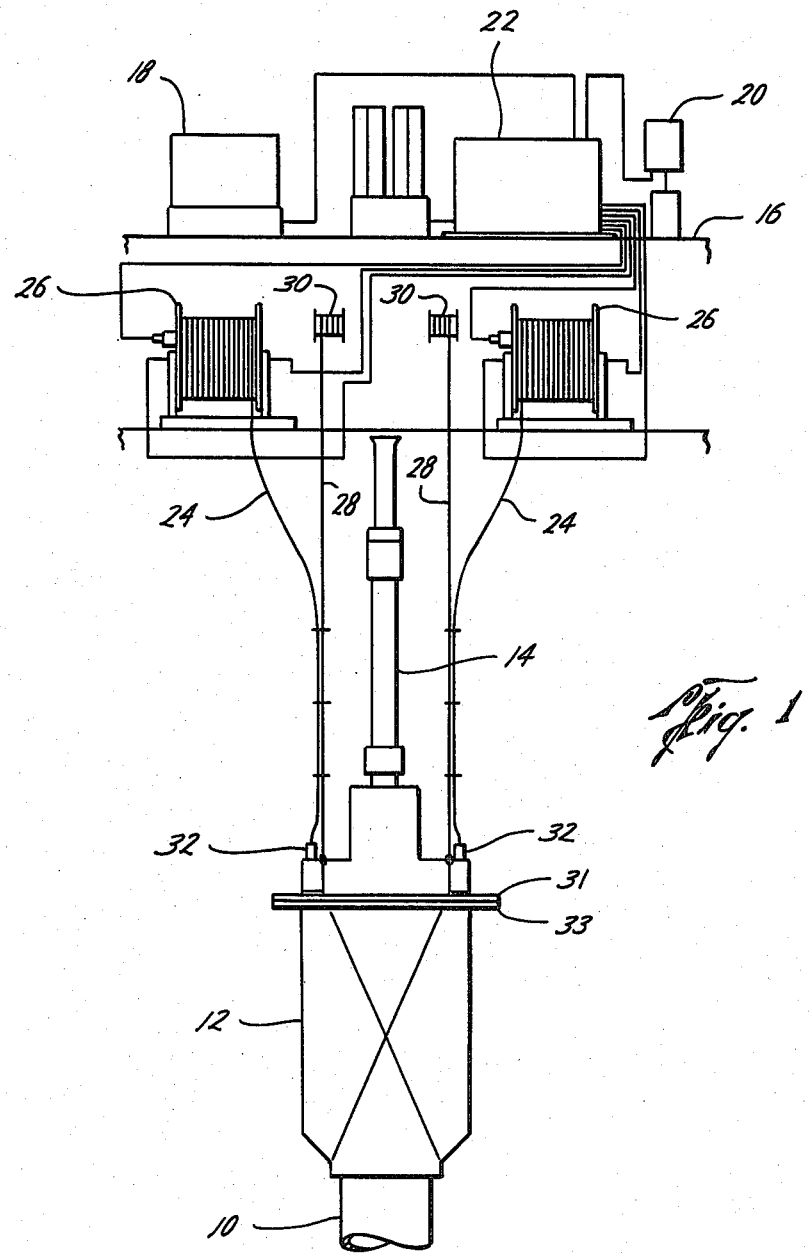
FIG. 1 is an elevation view of drilling apparatus used in drilling an underwater well and includes the improved connection apparatus of the present invention.

FIG. 1 illustrates a marine drilling system including subsea wellhead 10 with blowout preventer stack 12 connected thereon and riser 14 extending to platform 16 at the water surface. Suitable controls are mounted on platform 16, such as driller's control panel 18, remote control panel 20, and hydraulic control panel 22. Flexible hoses 24 are wound on power reels 26 and cables 28 are wound on reels 30. Cables 28 each connect to one of connector pods 32 as do flexible hoses 24.

Figure 4:
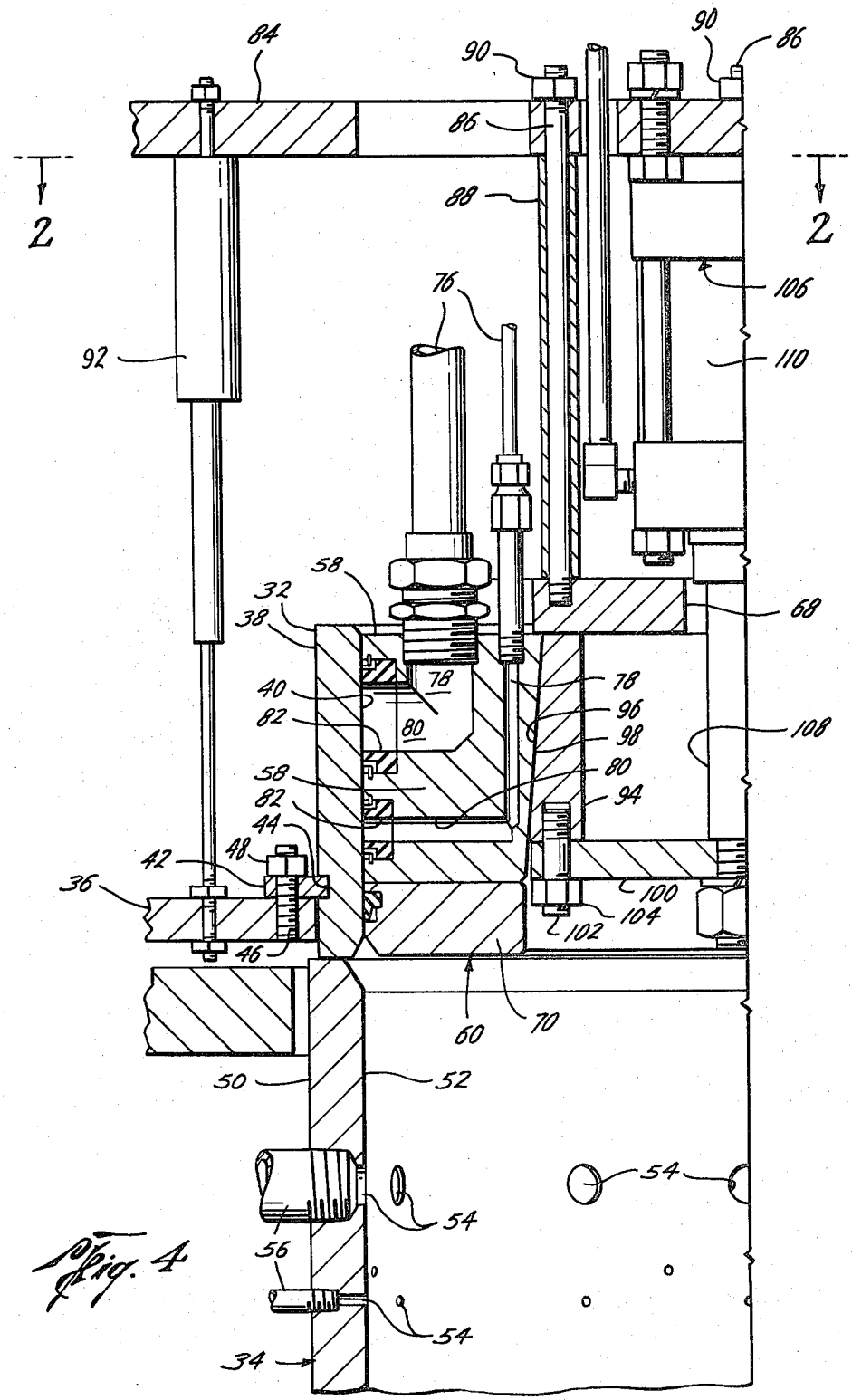
FIG. 4 is a sectional view taken along line 4—4 in FIG. 2 and shows the improved apparatus of the present invention in sealing position against the test ring sealing surface.
Figure 5:
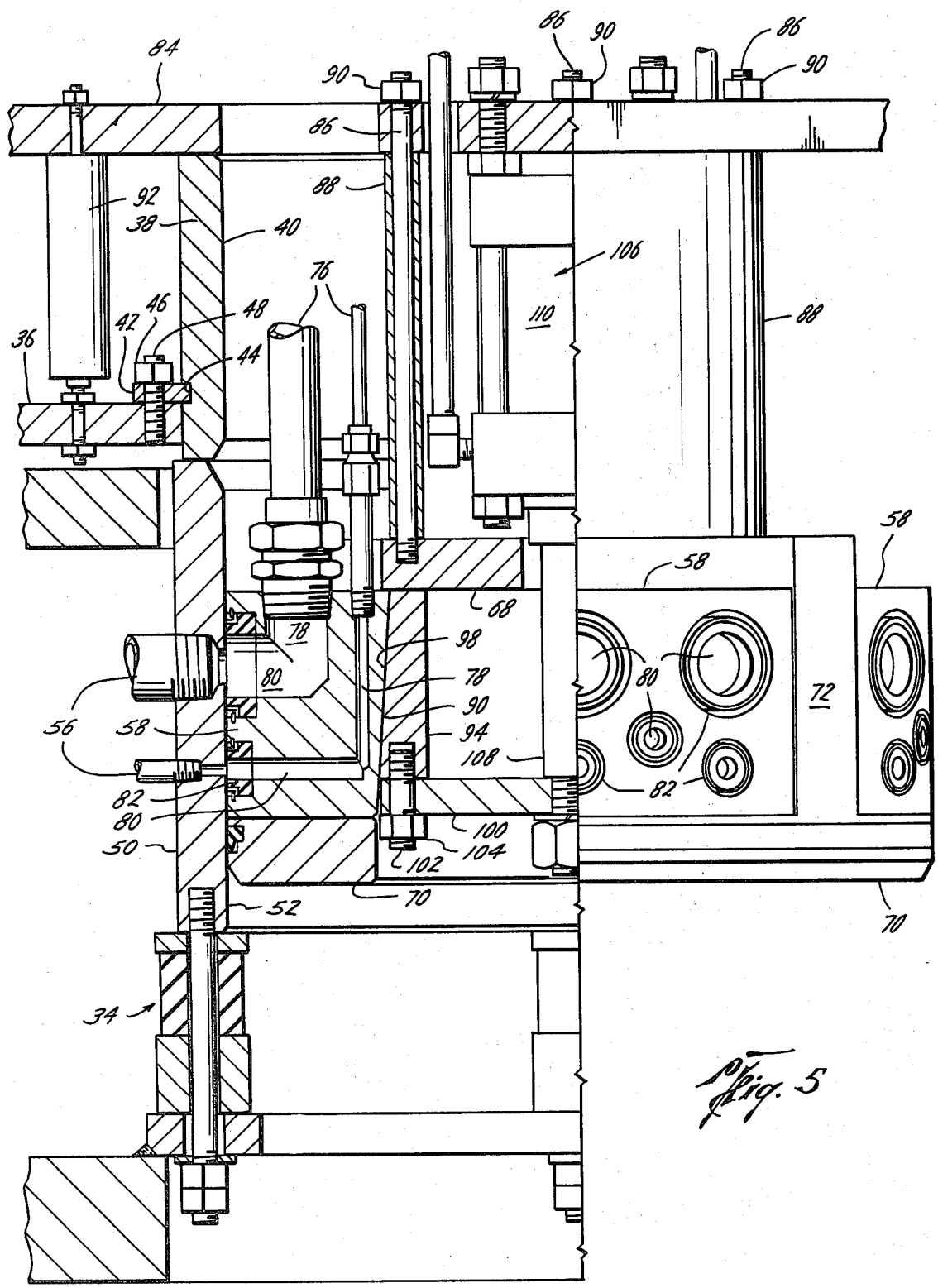
FIG. 5 is another sectional view similar to FIG. 4 but shows the segments in sealing engagement with the sealing surface of the wellhead member.

Connector pods 32 include the improved connection apparatus of the present invention as hereinafter explained and are lowered into position on frame 31 which rides on cables 28 and engages frame 33 on the receptacles 34 which are attached to stack 12 as best shown in FIGS. 4 and 5 and more fully explained hereafter with respect thereto. Connector pods 32 each include base plate 36 which is suitably supported by cable 28 for lowering to and recovery from stack 12. Test sealing ring 38 having internal sealing surface 40 is suitably secured to base plate 36 by securing means such as split lock ring 42 which is positioned partially in groove 44 in the exterior of ring 38 and is clamped to plate 36 by stud 46 and nut 48. Thus, as the improved connection apparatus or pod 32 is landed on stack 12 as shown in FIG. 4, test sealing ring 40 is positioned on the upper end of receptacle ring 50. Receptacle ring 50 has internal sealing surface 52 with radial passages 54 opening on sealing surface 52 and in communication with lines 56 which lead to stack 12. It should be noted that no seals are provided in ring 50 around radial passages 54.

Figure 2:
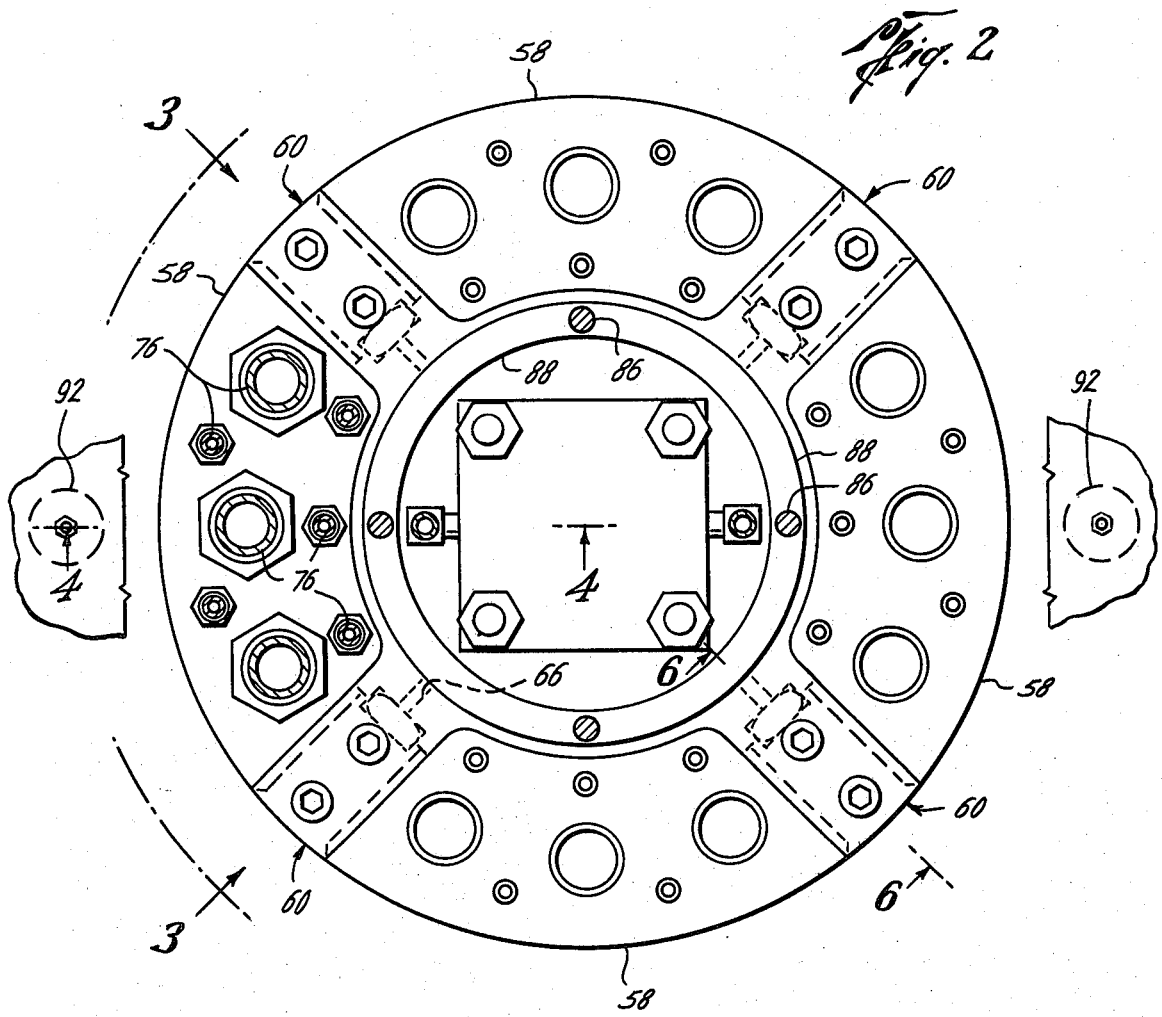
FIG. 2 is a plan view of the improved connection apparatus of the present invention taken along line 2—2 in FIG. 4.
Figure 3:
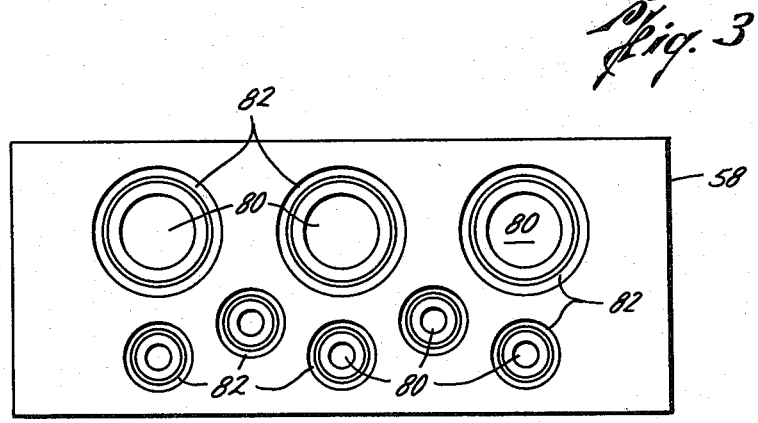
FIG. 3 is an external wrap-around or layout view taken along lines 3—3 in FIG. 2 to illustrate the position of the passages on the outer sealing surface of one of the segments.

Pod 32 also includes a plurality of segments 58 mounted in support structure 60 for a short radial movement to allow movement outward into sealing engagement with either sealing surface 40 on test ring 38 or sealing surface 52 on receptacle ring 50. Each of segments 58 includes means for biasing it inwardly. Such biasing means includes elastomer springs 62 which when compressed are shaped like a ring of generally circular section and when free standing are generally tubular in shape as shown in FIGS. 6 and 7. Springs 62 are positioned in slots 64 in support structure 60 and exert an inward force on ears 66 projecting from the sides of segments 58. Support structure 60 as best seen in FIGS. 2, 6 and 7 includes upper plate 68, lower plate 70 and radially positioned insert 72 suitably secured as by cap screws 74, between and to plates 68 and 70 and having slots 64 in their rear surface.

Flexible lines 76 are connected to the upper surface of segments 58 in communication with passages 78 which terminate in radial passages 80 surrounded by seals 82 on the outer surface or segments 58.

Support structure 60 is rigidly secured to top plate 84 by studs 86 extending through spacer ring 88 and threadedly received in upper plate 68 and nuts 90 are secured on the outer end of studs 86 against the upper surface of plate 84. Top plate 84 is movably attached to base plate 36 by hydraulic actuators 92 (only one being shown in FIGS. 4 and 5). Thus, in lowering pod 32 actuators 92 are preferably extended to position segments within test sealing ring 38 to protect seals 82. Whenever it is desired to bring segments into engagement within receptacle ring 50, actuators 92 are retracted to the position shown in FIG. 5.

Cam means is provided to move segments outward into sealing position for sealing within test ring 38 or receptacle ring 50. Such cam means includes ring 94 having external tapered surface 96 which coacts with surface 98 on the interior of segments 58 which has a mating taper. Ring 94 is secured to plate 100 by studs 102 and nuts 104. Plate 100 is movably attached to top plate 84 by actuator 106 so that when actuator 106 is extended ring 94 and plate 100 are in their lower position which allows segments 58 to retract and when actuator 106 is retracted ring 94 and plate 100 are in their upper position camming segments to their outer sealing positions. As shown, actuator 106 has its arm 108 secured to plate 100 and actuator cylinder 110 is secured to top plate 84.

In operation the improved connection apparatus of the present invention is assembled at the surface on platform 16. Actuator 92 is extended to move segments 58 into position within test sealing ring 38 so that seals 82 are protected as the pod is lowered downward onto stack 12. It is suggested that the cam means be actuated to move segments 58 into sealing engagement with surface 40 of test ring 38 and that pressure be supplied to lines 76 to test the lines and seals for leaks before commencing with the lowering of pods 32. The engagement of frame 31 on cables provides orienting of segments 58 with respect to receptacle ring 50 so that when segments 58 are lowered therein by the retraction of actuator 92 passages 80 come into register with passages 54 in ring 50. When pods 32 have contacted receptacle 34 as shown in FIG. 4, segments 58 are again cammed into sealing position against surface 40 of test ring 38 so that the complete system may be checked for leaks independent of receptacle 34, its lines 56 and the connected equipment on stack 12.

Once it has been determined that the system is free of leaks, actuators 92 are retracted after cam ring 94 has been withdrawn from behind segments 58 to move segments 58 into position within ring 50 and then actuator 106 is again used to move cam ring 94 behind segments 58 to move segments 58 outward into sealing position against surface 52 of ring 50. In this position all of the connections have been made from platform 16 to stack 12. Whenever a leak is found to occur in any of the hydraulic lines, it is a simple matter to release segments 58 by disengaging cam ring 94, raising segments 58 to a position within test ring 38 by extending actuators 92 and again setting segments into sealing engagement with surface 40 on the interior of test ring 38. In this position it can be determined whether or not the leak is in the pod system or in the system connected to the stack. If it is in the pod system then the pod 32 is recovered and the faulty equipment replaced. If the leak is in the stack equipment, it is known immediately and no time is wasted in pulling the pod 32 to replace seals or to test at the surface since the test against test ring 38 has established that the pod portion of the hydraulic system is free of leaks.

What is claimed is:

1. A remote connection apparatus comprising
a plurality of segments each having a sealing surface with ports therein and a tapered surface opposite said sealing surface,
a segment support in which said segments are positioned and movable in a radial direction,
cam means coacting with the tapered surface of said segments to move said segments toward a sealing position,
means supported between said segments and said segment support to urge said segments in a direction away from sealing position,
a test ring having a sealing surface,
means for moving said segments, said segment support and said cam means vertically to bring said segments to a first position radially spaced from said test ring sealing surface and to a second position radially spaced from the preselected mating surface of a remote member.

2. An apparatus according to claim 1 wherein
said segments are moved outwardly said cam means to seal against said test ring sealing surface and said remote member mating surface.

3. An apparatus according to claim 1 including
a receptacle ring providing said mating surface.

4. A hydraulic control pod connector comprising
a base plate,
an annular ring secured to the base plate and having a test sealing surface,
a plurality of segments having passageways therethrough and terminating in radial passages,
cam means coacting with said segments to move the segments radially into their sealed positions,
means biasing said segments away from said sealed positions, and
means for raising and lowering said segments to position said segments for sealing against the test sealing surface of said ring in one position and for sealing against a seal surface of a wellhead member having radial passages so that the segment passages register with the wellhead member passages in another position.

5. A connector according to claim 4 including
a top plate,
means for supporting said segments from said top plate, and
said raising and lowering means moving said top plate, said supporting means and said segments with respect to said base plate.

6. A connector according to claim 4 including
a receptacle ring supported on the subsea wellhead to provide said seal surface with radial passages therein.

7. A connector pod apparatus for providing multiple hydraulic connections to a subsea wellhead member having a receptacle ring with passages exiting radially from its internal section subsurface comprising
- a base plate,
- a test ring secured to said base plate and having an internal sealing surface,
- a plurality of segments having internal passages terminating in radial passages on their outer surface,
- means for connecting flexible lines to the passages in said segments,
- means for supporting said segments to allow radial movement,
- cam means for moving said segments radially outward,
- means for raising said segments to a position within said test ring and for lowering said segments below said test ring to allow said segments to be positioned within said receptacle ring when said pod apparatus is loaded on said subsea wellhead member whereby sealing of the segments against the test ring sealing surface allows testing of the pod apparatus for leaks and sealing against said sealing surface of said receptacle ring provides fluid connections to the passages in the receptacle ring.

* * * * *